United States Patent [19]

Habighorst

[11] 4,267,460
[45] May 12, 1981

[54] WALL SWITCH FOR CONVENIENCE OUTLETS

[76] Inventor: Harry D. Habighorst, 14601 N. 25th St., Phoenix, Ariz. 85032

[21] Appl. No.: 104,312

[22] Filed: Dec. 17, 1979

[51] Int. Cl.³ .......................... H02J 4/00; H02J 3/00
[52] U.S. Cl. ................................. 307/38; 200/1 R; 200/11 D; 315/317; 307/115
[58] Field of Search .............. 200/11 D, 11 DA, 297, 200/303, 1 R, 5 A, 8 R; 339/31 M; 361/332, 334, 350; 315/314, 317, 321, 322; 307/12–147

[56] References Cited

U.S. PATENT DOCUMENTS

| | | | |
|---|---|---|---|
| 2,312,580 | 3/1943 | O'Brien | 307/12 |
| 3,466,454 | 9/1969 | Jamison | 307/12 |
| 3,707,697 | 12/1972 | Izumi | 339/14 R |
| 3,828,224 | 8/1974 | Hulshizer | 200/33 R |
| 3,889,132 | 6/1975 | Ureeland | 307/141 |
| 4,059,773 | 11/1977 | Nash | 307/115 |
| 4,144,420 | 3/1979 | Phillips | 307/141 |

Primary Examiner—L. T. Hix
Assistant Examiner—Stafford D. Schreyer
Attorney, Agent, or Firm—Warren F. B. Lindsley

[57] ABSTRACT

A wall switch incorporating therewith a selector switch which enables the connection of the wall switch in any one of several circuits whereby the switch may be made to control any one of several outlets in a room. The selection of the desired circuit or outlet is conveniently made by means of the selector switch which is accessible through a hole provided in the cover plate of the wall switch.

7 Claims, 8 Drawing Figures

WALL SWITCH FOR CONVENIENCE OUTLETS

BACKGROUND OF THE INVENTION

In the wiring of a house or office, it is a common practice to provide a wall switch for controlling voltage to one or more of the several convenience outlets distributed about the room. Such an arrangement permits a lamp plugged into one of the outlets to be turned on or off from a convenient location, as from a doorway.

Unfortunately, the appropriate outlet to be controlled from such a switch or location may change with the furniture arrangement or with the living habits of the occupant of the room. Once the wiring and switch installation is made, however, it is difficult or impossible to change the arrangement because the wiring is hidden and inaccessible inside the walls of the room.

What is needed is a wiring arrangement and the necessary associated electrical hardware which will permit the selection of the controlled wall outlet or outlets to be changed conveniently at any time after construction has been completed. The present invention provides the needed hardware for this purpose.

DESCRIPTION OF THE PRIOR ART

U.S. Pat. No. 4,144,420 discloses an automatic light switching system including a receptacle for an automatic timer whereby the circuit including the receptacle will be operated in response to predetermined setting of the timer.

U.S. Pat. No. 3,889,132 discloses a timer assembly designed to operate an outside light normally operated by a toggle switch inside a residence.

U.S. Pat. No. 3,707,697 discloses an electrical connecting and mounting frame for use in standard 115 AC electrical wiring systems which is intended to simplify mounting and wiring of switches, outlets, etc. at the time of installation and when replacements are needed.

U.S. Pat. No. 3,828,224 discloses a conventional switch and outlet receptacle provided in addition with a third slot with a contact electrically connected to a switch contact whereby an external connection from the latter slot and one of the outlet receptacle will complete a circuit.

SUMMARY OF THE INVENTION

In accordance with the invention claimed, a novel wall switch is provided for the selective control of one or more wall outlets distributed about a room.

It is, therefore, one object of this invention to provide a novel wall switch assembly for use in controlling voltage to any of several convenience wall outlets distributed about a room.

Another object of this invention is to provide in such an assembly a capability for selecting a particular one of the several outlets for ON/OFF control by the switch.

A further object of this invention is to provide in such an assembly a capability for conveniently altering the selection of the outlet at any time after the initial installation has been made.

A still further object of this invention is to provide such an assembly in a compact and inexpensive form.

A still further object of this invention is to provide such an assembly in a form that may be conveniently installed in a standard metal electrical switch or outlet box.

Further objects and advantages of the present invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing in which.

DESCRIPTION OF THE PREFERRED EMBODIMENT

Figure 1:
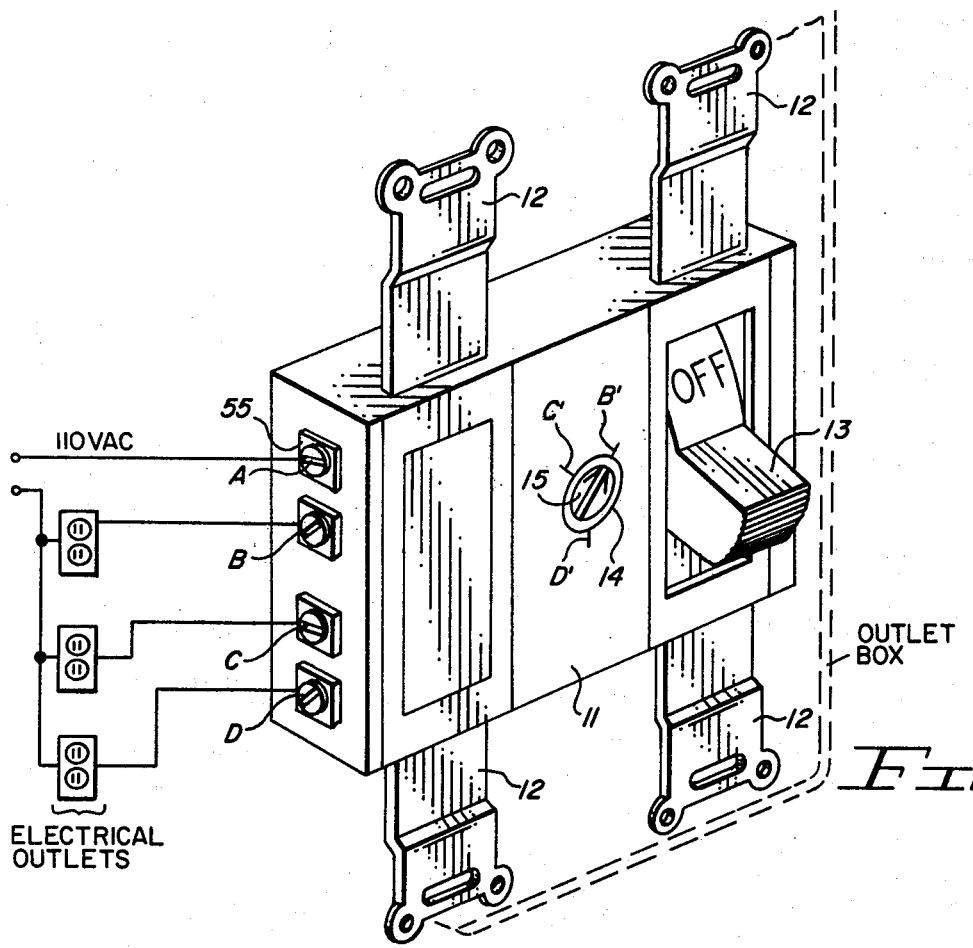
FIG. 1 is a perspective view of the novel wall switch assembly of the invention.

Referring more particularly to the drawing by characters of reference, FIGS. 1-8 disclose an improved wall switch assembly 10 for use in the selective ON/OFF control of voltage to one or more of several convenience outlets distributed about a room.

The switch 10 has an insulating housing 11 of metal, plastic, bakelite or similar material. It has four extending metal support brackets 12 for mounting in a standard double electrical outlet or switch box. It incorporates a standard ON/OFF wall switch 13, and a selector switch 14. A terminal A is provided for connection to the "hot" line or black wire comprising the voltage source; additional terminals B, C and D are provided for connection to the several outlets selectively controlled by the assembly 10. Selector switch 14 in the view of FIG. 1 is obscured from view except for the slotted control post 15 which protrudes through the housing 11. Control post 15 may be rotated by means of a screwdriver to one of three positions B', C' or D' to select the corresponding terminal B, C or D at the side of housing 11. When switch 14 is set to select one of the three positions, the ON/OFF switch 13 is connected between terminals A and the selected output terminal B, C or D; the unselected output terminals are connected directly to terminal A. In this invention the selector switch 14 is shown as comprising a three position configuration for illustrative convenience but it may comprise configurations ranging from two to six or more positions and still fall within the scope of the invention.

Figure 2:
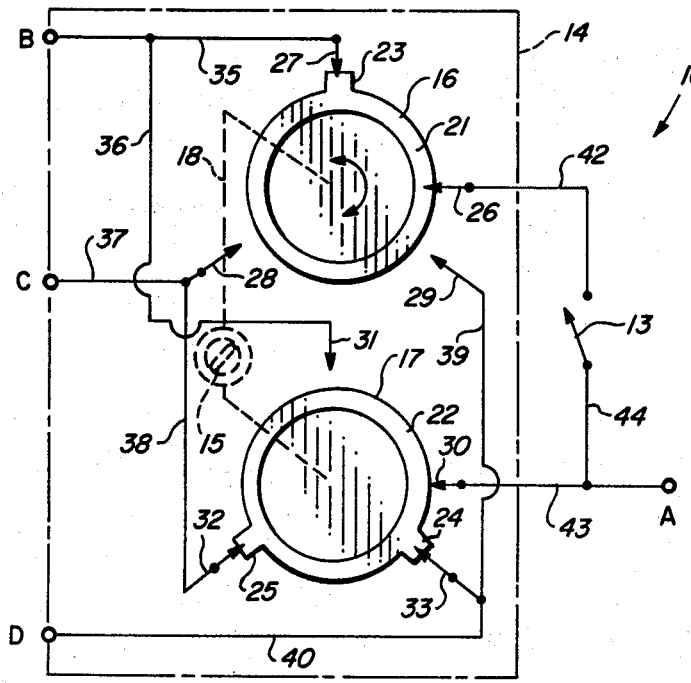
FIG. 2 is a schematic drawing showing the electrical circuit and connections internal to the switch assembly of FIG. 1.

The internal wiring and the switching function afforded by selector switch 14 are shown schematically in FIG. 2 where the assembly 10 is shown as comprising, broadly, the ON/OFF switch 13 and the selector switch 14, the latter bounded by the broken line.

As shown in FIG. 2, switch 14 may, for example, incorporate two wafers 16 and 17 mechanically ganged together at 18, their rotation effected by means of the slotted post 15.

Each of the wafers 16 and 17 is generally circular, i.e., in the shape of a disc. Extending about the circumference of each wafer, 16 and 17, is a circular conductive track, 21 and 22, respectively. Extending radially outward from track 21 at the twelve o'clock position is a conductive tab 23. Two identical conductive tabs 24 and 25 extend radially outward from track 22 at the four o'clock and eight o'clock positions, respectively. Tabs 23, 24 and 25 are noted to be mutually displaced from each other by 120 degrees.

Also incorporated in switch 14 are eight brushes or contact wipers, 26-33. Wiper 26 is in constant contact with track 21 of wafer 16 and wiper 30 is in constant contact with track 22 of wafer 17, independent of the angular rotation of the wafers 16 and 17 as effected by means of post 15. Wipers 27, 28 and 29 are symmetrically spaced about wafer 16, mutually displaced from each other by 120 degrees, wiper 27 being located as shown at the twelve o'clock position, wiper 28 at the eight o'clock position, and wiper 29 at the four o'clock position. Wipers 27, 28 and 29 are also co-planar with wafer 16 and their radial displacement therefrom is such that when wafer 16 is rotated, the tab 23 makes physical contact with each of the wipers 27-29 as it passes by. Thus, in the position of wafer 16 shown in FIG. 2, tab 23 makes physical and electrical contact with wiper 27. If wafer 16 is rotated 120 degrees clockwise, tab 23 will make contact with wiper 29. A 120 degree clockwise rotation of wafer 16 causes tab 23 to make contact with wiper 28.

Wipers 31-33 are similarly disposed about wafer 17 with wiper 31 at twelve o'clock, wiper 32 at eight o'clock and wiper 33 at four o'clock. In the position shown tabs 24 and 25 are in physical contact with wipers 33 and 32, respectively. If wafer 17 is rotated 120 degrees clockwise, tabs 24 and 25 will make contact, respectively, with wipers 32 and 31. An additional 120 degrees of clockwise rotation will align tabs 24 and 25 with wipers 31 and 33, respectively.

Electrical connections as shown in FIG. 2 include the following: Wipers 27 and 31 are connected to terminal B by electrical conductors 35 and 36; wipers 28 and 32 are connected to terminal C by conductors 37 and 38; wipers 29 and 33 are connected to terminal D by conductors 39 and 40' wiper 26 is connected to one terminal of switch 13 by conductor 42; and wiper 30 is connected to terminal A and to the other terminal of switch 13 by conductors 43 and 44.

The functionality of switch 14 in selectively connecting switch 13 in series with terminal B, C or D may now be understood by examination of FIG. 2. In the position shown for switch 14, an electrical current entering at terminal A may pass directly through conductor 43, and wiper 30 to track 22 from whence it may branch through tab 24 and wiper 33 to conductor 40 and terminal D and through tab 25 and wiper 32 to conductors 38 and 37 and terminal C. Electrical current to terminal B must pass through conductor 44, switch 13, conductor 42, track 21, tab 23, wiper 27 and conductor 35. Opening or closing switch 13 thus controls current only to terminal B, and only lamps or other electrical loads connected to terminal B are affected.

If switch 14 is now rotated 120 degrees clockwise with tab 23 moving to the position of wiper 29 it will be seen that switch 13 is connected between terminals A and D while terminal A is connected directly to terminals B and C through wafer 17. Switch 13 thus controls, in this case, only the loads connected to terminal D. A further 120 degrees of clockwise rotation connects switch 13 between terminals A and C.

A mechanical implementation of the selector switch 14 is shown in FIGS. 3-8, the switch 14 comprising a circuit board 50, a wafer 51 with center-post 15, wipers 26-31 and terminals A, B, C and D. (Where the same identifying characters of reference are employed in FIGS. 3-8 that are employed in FIGS. 1 and 2, the referenced parts are intended to correspond.)

Board 50 and wafer 51 are mounted inside housing 11 of assembly 10 as shown in FIG. 1, with terminals A, B, C and D appearing at the surface. A circular cutout 52 at the center of board 50 receives wafer 51 as shown. The centered co-planar orientation and position holding detent of wafer 51 inside cutout 52 is maintained by standard mechanical means not shown.

Board 50 may be constructed of the usual plastic, bakelite or other suitable material. The conductive paths on board 50 may be of the copper ribbon type of appropriate size either cemented to, or molded into, or attached by other suitable means to the surfaces of board 50. In this instance, any technique used must provide the desired current carrying capacity of household needs and meet the electrical code requirements of the governing agency. As shown in FIGS. 3, 5, 6 and 7, the wipers 26-31 are fastened to the board 50 by means of rivets 53. The conductors 35, 37, 40, 42, 43, etc. which connect the wipers 26-31 to the terminals A, B, C and D comprise in this case copper runs on the surface of board 50. Terminals A, B, C and D are simply bent metal tabs which are staked, riveted or soldered to the board 50 over the copper runs. A threaded hole 54 in the bent-up portion of the tab receives the screws 55 shown in FIG. 1 that are employed for making external connections to the assembly 10.

Figure 4:
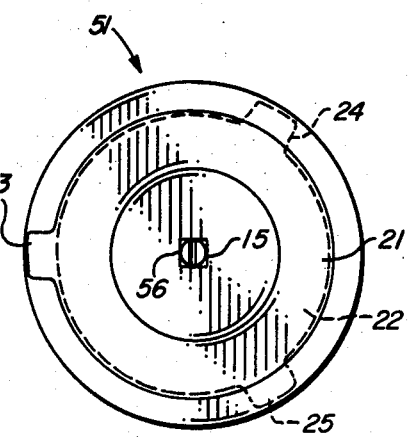
FIG. 4 is a plan view of a circular wafer which is a part of the selector switch assembly of FIG. 3.
Figure 3:
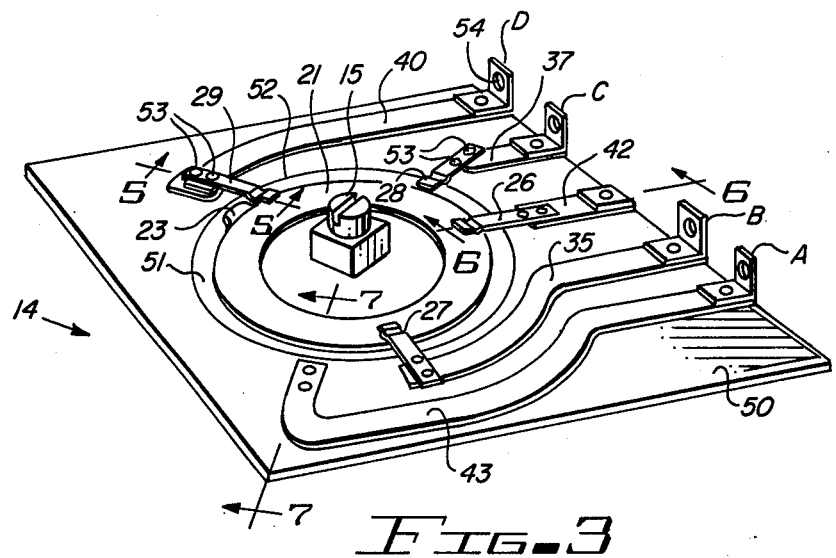
FIG. 3 is a perspective view of a selector switch assembly incorporated in the assembly of FIG. 1.

The wafer 51 as shown in FIGS. 3 and 4 is also fashioned using plastic, bakelite or other suitable material. The conductive patterns attached to wafer 51 may be fashioned using copper sheeting of appropriate thickness and being cemented to, molded into, or attached by other suitable means to wafer 57. Attached to the top surface of wafer 51 is the first said conductive pattern corresponding to wafer 16 of FIG. 2 which incorporates conductive path 21 and the extending tab 23. Attached to the underside of wafer 51 is the second said conductive pattern corresponding to wafer 17 of FIG. 2 which incorporates conductive path 22 with two extending tabs 24 and 25. As described earlier, the tabs 23, 24 and 25 are mutually displaced from each other by 120 degrees. A rectangular hole 56 in the center of wafer 51 receives the rectangular body of post 15.

The wipers 26, 27, 28 and 29 are secured to the top side of board 50 as shown in FIG. 3. The wipers 27, 28 and 29 are mutually displaced from each other by 120 degrees, and their working ends extend across the edge of cutout 52 over the outer periphery of wafer 51 so as to contact only the tab 23 when rotationally aligned therewith. Wiper 26 is positioned to extend a greater distance past the periphery of wafer 51 so as to bear at all times against track 21.

Similarly, on the underside of board 50 the wipers 31, 32 and 33 are positioned directly beneath the wipers 27, 28 and 29, respectively, and extend appropriately to make contact when angularly aligned with tabs 24 and 25. Wiper 30, also mounted to the underside of board 50 makes contact at all times with track 22.

Figure 5:
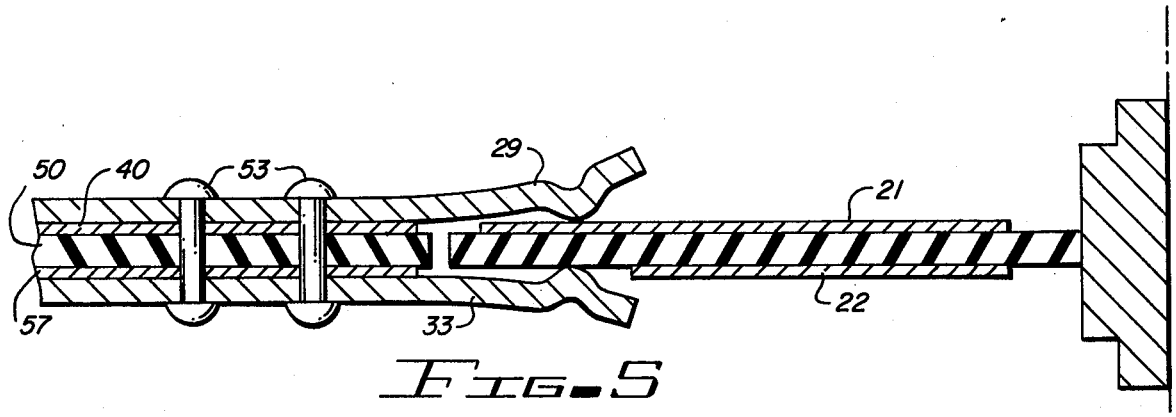
FIG. 5 is a partial cross-sectional view of the assembly of FIG. 3 as seen along line 5—5 of FIG. 3.

FIG. 5 illustrates the mounting method employed for mounting wipers 29 and 31 to board 50. Rivets 53 pass through wiper 29, board 50 and wiper 33 to secure the mechanical mounting of both wipers. At the same time the rivets 53 make the electrical connection between wipers 29 and 33 that is made in FIG. 2 by conductor 39. Copper run 40 corresponding to conductor 40 of FIG. 2 extends beneath the end of wiper 29 that is secured by the rivets 53. A copper area 57 may also be provided under the end of wiper 33 as a means for surface alignment of wiper 33 with wafter 51. The same means is employed for mounting wiper 28 with wiper 32 and wiper 27 with wiper 31.

Figure 6:
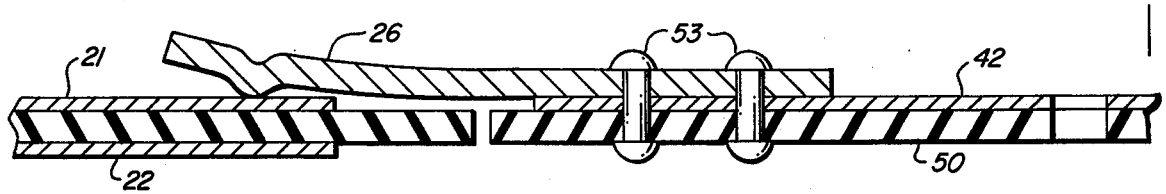
FIG. 6 is another partial cross-sectional view of the assembly of FIG. 3 as seen along line 6—6 of FIG. 3.
Figure 7:
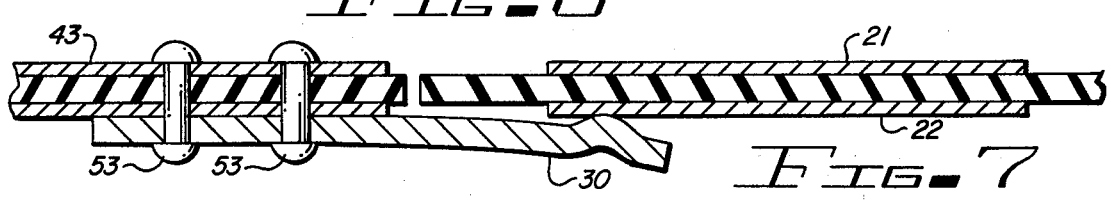
FIG. 7 is yet another partial cross-sectional view of the assembly of FIG. 3 as seen along line 7—7 of FIG. 3.

The remaining two wipers 26 and 30 are individually mounted because they do not have common electrical connections with each other. Wiper 26 is riveted to the top side of board 50 over the end of copper run 42 as shown in FIG. 6, and wiper 30 is riveted to the underside of the board 50 as shown in FIG. 7, the rivets 53 in this case making the electrical connection to the run 43 which is on the top side of the board.

To assure the integrity of the electrical connections made by means of the rivets 53, the attachments of the wipers 26-33 and the terminals A-D may be further secured by soldering to the copper runs on the board 50.

Figure 8:
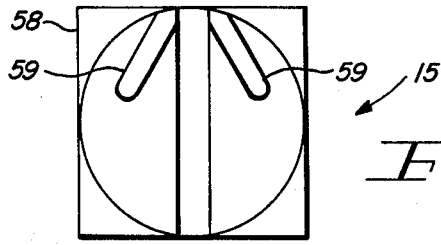
FIG. 8 is a plan view of the center-post and adjustment screw of the wafer of FIG. 4.

As shown most clearly by FIG. 3 and by the enlarged view of FIG. 8, the center-post 15 has a rectangular main body 58 to permit its non-rotational coupling to wafer 51. Its extremities, however, are cylindrical to permit its rotational mounting in housing 11. The slotted end which extends through the center of housing 11 as shown in FIG. 1 has embossed pointers 59 to indicate the instant rotational orientation of the wafer 51 so that as shown in FIG. 1 when the pointers 59 are directed toward the letter B', the switch 13 is indicated as being connected to terminal B, etc.

In use, the assembly 10 is installed at the time the original electrical wiring is done. One or more convenience outlets is connected to each of the terminals B, C and D and the voltage source is connected to terminal A. The selector switch 14 is set to select the desired circuit with the end of control post 15 extending through the cover plate mounted over the switch. When at some later date it is desired to transfer control of the ON/OFF switch 13 to another circuit or convenience outlet, the control post is operated to select the desired circuit. It should be noted that the control post may be concealed behind the cover plate if so desired.

An improved and versatile wall switch assembly is thus provided in accordance with the stated objects of the invention, and although but a single embodiment of the invention is illustrated and described, it will be apparent to those skilled in the art that various changes and modifications may be made therein without departing from the spirit of the invention or from the scope of the appended claims.

What is claimed is:

1. A switch assembly for connecting at least two spaced electrical outlets to a power source with one of them being selectively connected to the power source through an on-off switch comprising:
   an on-off switch having a pair of terminals, one of which is connected to the power source,
   a selector switch,
   said selector switch comprising a pair of juxtapositioned axially aligned disc like members, each having an arcuate conductive path,
   one of said members being conductively connectable to each of said electrical outlets at spaced rotative positions along its path and continuously along its path to said one of said terminals of said on-off switch,
   the other of said members being conductively connectable to each of said electrical outlets at spaced relative positions along its path and continuously along its path to the other terminal of said on-off switch,
   the other of said members at a given position connecting a selected one of the electrical outlets through said other terminal of said on-off switch and when in another given position connecting the other electrical outlet through said other terminal of said on-off switch while said one of said members selectively connects the non-selected outlet to said one of said terminals of said on-off switches, and
   means for rotating said members in unison for selectively connecting one or another of said electrical outlets through said on-off switch to the power source.

2. The switch assembly set forth in claim 1 wherein:
   each of said members is provided with tabs protruding outwardly of the arcuate conductive path on each of said members at said spaced positions for slidably engaging with a conductor of the associated electrical outlet.

3. The switch assembly set forth in claim 1 wherein:
   the arcuate conductive path of each of said members extends around its outer periphery in a closed loop path, and
   each of said members is provided with tabs protruding outwardly of the arcuate conductive path of each of said members at said spaced positions for slidably engaging with a conductor of the associated outlet.

4. The switch assembly set forth in claim 1 wherein:
   said means comprises a center post extending through the center of each of said members.

5. The switch assembly set forth in claim 4 wherein:
   said center post is slotted at an exposed end for rotation by a screw driver.

6. The switch assembly set forth in claim 5 in further combination with:
   an outlet box for housing said assembly with said on-off switch and the exposed end of said center post extending outwardly of a common exposed surface of said box.

7. The switch assembly set forth in claim 6 wherein:
   said box comprises a standard double electrical switch box.

* * * * *